United States Patent [19]

Ishiguro et al.

[11] Patent Number: 5,415,933
[45] Date of Patent: May 16, 1995

[54] MAGNETIC RECORDING MEDIUM CONTAINING A BIAXIALLY ORIENTED MULTILAYER SUPPORT

[75] Inventors: Tadashi Ishiguro; Takeshi Kakuta; Kazuo Kato; Noburo Hibino, all of Kanagawa, Japan

[73] Assignee: Fuji Photo Film Co., Ltd., Kanagawa, Japan

[21] Appl. No.: 107,114

[22] Filed: Aug. 17, 1993

[30] Foreign Application Priority Data

Aug. 18, 1992 [JP] Japan ................................. 4-219221

[51] Int. Cl.$^6$ .................... B32B 33/00; G11B 5/66; G11B 5/70
[52] U.S. Cl. .................... 428/336; 428/402; 428/694 B; 428/694 BN; 428/694 BM; 428/694 ST; 428/694 SL; 428/694 SG; 428/910
[58] Field of Search ...... 428/694 B, 694 BR, 694 BN, 428/694 BM, 694 SG, 694 ST, 900, 910, 336, 402

[56] References Cited

U.S. PATENT DOCUMENTS

| | | | |
|---|---|---|---|
| 4,505,966 | 3/1985 | Adachi et al. | 428/141 |
| 4,720,412 | 1/1988 | Katoh et al. | 428/141 |
| 4,732,799 | 3/1988 | Sakamoto et al. | 428/141 |
| 4,863,793 | 9/1989 | Ogawa et al. | 428/323 |
| 4,963,433 | 10/1990 | Ogawa et al. | 428/323 |
| 5,051,291 | 9/1991 | Kawahara et al. | 428/141 |
| 5,085,915 | 2/1992 | Taga et al. | 428/141 |
| 5,116,658 | 5/1992 | Miyake | 428/141 |
| 5,128,206 | 7/1992 | Fiard et al. | 428/337 |
| 5,178,935 | 1/1993 | Saito et al. | 428/212 |
| 5,252,388 | 10/1993 | Murooka et al. | 428/328 |

FOREIGN PATENT DOCUMENTS 3-86916  4/1991  Japan ............................ G11B 5/704

*Primary Examiner*—Paul J. Thibodeau
*Assistant Examiner*—Stephen Sand
*Attorney, Agent, or Firm*—Sughrue, Mion, Zinn, Macpeak & Seas

[57] ABSTRACT

A magnetic recording medium is disclosed, which is formed by providing on a non-magnetic support, a lower layer comprising at least one of a ferromagnetic powder and a non-magnetic powder dispersed in a binder, and providing on the lower layer while the lower layer is in a wet condition, an upper magnetic layer comprising a ferromagnetic powder dispersed in a binder, wherein the upper magnetic layer has a dry thickness of 1.0 μm or less, and the non-magnetic support is a multi-layer structural support comprising at least an uppermost support layer and a lowermost support layer, wherein the uppermost support layer is coated with the lower non-magnetic or magnetic layer, each of the uppermost layer and the lowermost layer comprises a biaxially oriented film comprising a thermoplastic resin containing filler particles, and the uppermost support layer has a center line average surface roughness Ra in the range defined by the following formula:

Ra(Cut off: 0.25 mm)−Ra(Cut off: 0.08 mm)≦10 nm.

6 Claims, No Drawings

MAGNETIC RECORDING MEDIUM CONTAINING A BIAXIALLY ORIENTED MULTILAYER SUPPORT

FIELD OF THE INVENTION

This invention relates to a magnetic recording medium, and more particularly to a magnetic recording medium having a very thin magnetic layer of 1.0 μm or less. More specifically, the present invention relates to a coated type magnetic recording medium for high-density recording which has excellent productivity by calendering and is excellent in running durability.

BACKGROUND-OF THE INVENTION

Magnetic recording mediums are widely used in the fields of recording tapes, video tapes, computer tapes and disks. In the field of the magnetic recording mediums, higher recording density has been demanded, and therefore recording wavelengths have been shortened. The recording systems ranging from the analog system to the digital system have been examined. Magnetic recording mediums using a thin metallic film as the magnetic layer have been proposed to meet the requirements of higher recording density. Coated type magnetic recording mediums prepared by coating a binder containing ferromagnetic powder dispersed therein, on a support are superior in productivity and corrosion resistance.

However, the degree of loading of the ferromagnetic powder in the coated type magnetic recording mediums is low in comparison with the thin metallic film type magnetic recording mediums. Hence the coated type magnetic recording mediums are inferior in electromagnetic characteristics.

Coated type magnetic recording mediums comprising a non-magnetic support having thereon a magnetic layer composed of a ferromagnetic substance such as ferromagnetic iron oxide, Co-modified iron oxide, $CrO_2$ or a ferromagnetic alloy powder dispersed in a binder, are widely used. Various methods have been proposed to improve the electromagnetic characteristics of the coated type magnetic recording mediums. For example, attempts have been made to improve the magnetic characteristics of the ferromagnetic powder or to smoothen the surface of the magnetic layer. However, the requirements for higher recording density cannot be sufficiently met.

Recording wavelengths have been shortened and recording density has been improved in recent years. However, when the thickness of the magnetic layer is increased, output is lowered. Problems with regard to self-demagnetization loss during recording and thickness loss during reproduction, become serious.

Therefore, in order to solve the above problems, the thickness of the magnetic layer has been reduced. However, when the thickness of the magnetic layer is reduced to about 2 μm or less, the surface of the magnetic layer is likely to be affected by the surface roughness of the non-magnetic support. Further, the electromagnetic characteristics and DO (drop out) may deteriorate.

The effect of the surface roughness of the non-magnetic support on the surface of the magnetic layer can be improved to some degree by providing a non-magnetic thick undercoat layer on the surface of the support, and providing thereon a magnetic layer as the upper layer as described in JP-A-57-198536 (the term "JP-A" as used herein means an "unexamined published Japanese patent application"). However, the degree of the improvement is insufficient, and problems exist in that head friction and durability cannot be improved. This may be caused by the fact that a thermosetting resin as a binder is conventionally used in the non-magnetic lower layer, the lower layer is cured, and the friction between the magnetic layer and head, or the contact of the magnetic layer with other members, is made in a non-cushioning state. Alternatively, it may be that the magnetic recording medium having a lower layer as described above is slightly poor in flexibility. It can be considered that a non-curing resin such as a binder is used in the lower layer to solve the above-described problems. In conventional methods, however, when the magnetic layer as the upper layer is coated after the coating and drying of the lower layer, problems result such as the lower layer swelling by an organic solvent contained in a coating composition for the upper layer and a turbulent flow forming in the coating solution for the upper layer. Aa a result, the surface properties of the magnetic layer are deteriorated and electromagnetic characteristics are lowered.

The thickness of the magnetic layer can be reduced by decreasing the coating weight of the coating composition or lowering the concentration of the magnetic coating composition by adding a large amount of a solvent to the magnetic coating composition. In the former case, where the coating weight of the coating composition is decreased, the time required for leveling after coating is shortened so that when the coating composition begins to dry a failure in coating occurs. For example, stripes or marked patterns are left behind, and yield is very low. In the latter case, where the concentration of the coating composition is lowered, there are the disadvantages that the concentration of the magnetic coating composition is dilute, many voids are formed in the resulting coating film and a sufficient degree of the loading of the magnetic substance cannot be attained, and when many voids are formed, the strength of the coating film is insufficient. Poor yield is a serious problem as described in JP-A-62-154225.

U.S. Pat. No. 4,963,433 (corresponding to JP-A-63-191315) and U.S. Pat. No. 4,863,793 (corresponding to JP-A-63-187418) propose a magnetic recording medium having improved electromagnetic characteristics by using a simultaneous multi-layer coating system as a means for solving the above-described problems. However, the following problems are not solved by this system.

Namely, when the thickness of the magnetic layer is reduced to as thin as 1 μm or less, a failure in coating occurs. For example, pinholes and stripes are likely to form. Therefore, productivity is hard to ensure.

Further, it is demanded to provide a magnetic recording medium having very smooth surface properties. Calendering, in particular, must be carried out under high temperature and high pressure conditions to obtain very smooth surface properties. When calendering is carried out under high temperature and high pressure conditions, the friction between the opposite side of the support to the magnetic layer side, and the calender roll is increased, this results in the support being cut during the preparation of the magnetic recording medium, and the calender rolls become contaminated. When the rolls are contaminated, contaminated marks are left on the magnetic layer after calendering and as a result, a lowering in electromagnetic characteristics and an increase in drop out occur.

A magnetic recording medium comprising a polyethylene terephthalate base having thereon a lower magnetic layer (first magnetic layer) and an upper magnetic layer (second magnetic layer) in this order, wherein the polyethylene terephthalate base contains inert inorganic particles having an average particle size of 0.5 to 0.7 $\mu m$ and such a particle size distribution that the standard deviation thereof is 0.1 $\mu m$ or less, and wherein the polyethylene terephthalate base has a center line average roughness (Ra) of 16 nm or less and has protrusions of 0.7 $\mu m$ or above at a protrusion density (Ds) of at least 6,000 protrusions/$mm^2$ has been proposed in order to provide a magnetic recording medium with high productivity which has a magnetic layer having excellent electromagnetic characteristics provided on the base having a smooth surface and moreover, which has good running durability on the back side without providing a back coat layer. However, the degree of the improvement is still insufficient merely by decreasing Ra. U.S. Pat. No. 5,116,658 (corresponding to JP-A-3-176809) proposes the reduction of undulation on the surface of the magnetic layer and the interfacial undulation of the support. However, the improvement of electromagnetic characteristics are still insufficient merely by reducing undulation, and protrusions in the amount of 0.30 $\mu m$ (300 nm) in height present on the opposite side of the support to the magnetic layer is small so that unevenness is distinct and running properties are poor.

JP-A-3-86916 discloses a non-magnetic support having a two-layer structure which is a multi-layer non-magnetic support, wherein the lower layer thereof contains a given amount of filler particles having a given particle size. When the magnetic recording medium having such a support as described above is wound up, the magnetic layer side and the back side of the support are brought into contact with each other, and various recesses are formed on the surface of the magnetic layer by protrusions formed by the filler particles. As a result, the electromagnetic characteristics are lowered by the formation of recesses. The costs of mechanical parts used in the latest VHS video cassette have been reduced. Hence, scuff resistance to so-called inferior pins, etc. becomes poor and as a result, problems with regard to DO increase, a failure in running, etc. are caused.

The present inventors have eagerly made studies to solve the above-described problems by paying attention to layer structures such as the surface roughness of the non-magnetic support and the state of the protrusions and the magnetic layer provided on the support. As a result, the present inventors have found that the center line average roughness Ra varies with the cut off values, and a remarkable improving effect can be obtained by taking into consideration a combination of the difference in Ra between the cut off values with a plurality of layers formed by providing an upper magnetic layer on a lower non-magnetic layer or a lower magnetic layer by means of a wet-on-wet (simultaneous or successive) coating system. The present invention had been accomplished on the basis of this finding.

SUMMARY OF THE INVENTION

Accordingly, an object of the present invention is to provide a magnetic recording medium having excellent electromagnetic characteristics.

Another object of the present invention is to provide a magnetic recording medium which is prevented from contamination by calender rollers, reduces the occurrence of drop out, has good durability against inferior mechanical parts, prevents the magnetic layer from being recessed by the non-magnetic support, and is excellent in electromagnetic characteristics as well as in running durability.

The above-described and other objects and advantages of the present invention have been achieved by providing a magnetic recording medium formed by providing on a non-magnetic support a lower layer comprising at least one of a ferromagnetic powder and a non-magnetic powder dispersed in a binder, and providing on the lower layer, while the lower layer is in a wet condition, an upper magnetic layer comprising a ferromagnetic powder dispersed in a binder, wherein the upper magnetic layer has a dry thickness of 1.0 $\mu m$ or less, and the non-magnetic support is a multi-layer structural support comprising at least an uppermost support layer and a lowermost support layer, wherein the uppermost support layer is coated with the lower non-magnetic or magnetic layer, each of the uppermost support layer and the lowermost support layer comprises a biaxially oriented film comprising a thermoplastic resin containing filler particles, and the uppermost support layer has a center line average surface roughness Ra in the range defined by the following formula:

$$Ra(Cut\ off: 0.25\ mm) - Ra(Cut\ off: 0.08\ mm) \leq 10\ nm.$$

DETAILED DESCRIPTION OF THE INVENTION

Now, the present invention will be illustrated in more detail below.

In the present invention, the uppermost support layer (layer A) has a difference between Ra(Cut off: 0.25 mm) and Ra(Cut off: 0.08 mm) of 10 nm or less, whereby the effects of the present invention can be obtained. Without wishing to be bound by any specific theory, it is theorized that a difference of 10 nm or less is a measure of undulation becoming less and surface unevenness becoming uniform. The lower non-magnetic or magnetic layer absorbing surface roughness is provided on the support having the above Ra value, and the upper magnetic layer is provided on the lower non-magnetic or magnetic layer by means of a wet-on-wet coating method as discribed in U.S. Pat. No. 4,844,946, whereby a very smooth, uniform magnetic recording medium can be obtained, and electromagnetic characteristics can be greatly improved.

Further, filler particles having an average particle size of 100 to 600 nm are contained in the lowermost layer (layer B) of the non-magnetic support used in the present invention, thereby obtaining a magnetic recording medium which is prevented from being contaminated by calender rolls, has a reduced occurrence of drop out, has good durability against inferior mechanical parts, has the ability to prevent the magnetic layer from being recessed by the non-magnetic support and is excellent in electromagnetic characteristics as well as in running durability.

In the present invention, the uppermost layer of the non-magnetic support (layer A) has a Ra value of Ra(-Cut off: 0.25 mm) − Ra(Cut off: 0.08 mm) ≤ 10 nm. The Ra value in the range defined above can be obtained by controlling the particle size and amount of filler particles to be added to uppermost layer A and by controlling the film forming conditions.

The filler particles contained in uppermost layer A of the non-magnetic support have an average particle size of preferably 10 to 450 nm, more preferably 10 to 350 nm. Further, a filler may be contained in uppermost support layer A within a general range as to amount of 1.5 to 40% by weight, preferably 2 to 15% by weight, based on the amount of the thermoplastic resin. The ratio (ta/da) of the average thickness ta of uppermost support layer A to the average particle size da of the filler particles is preferably 0.1 to 3, more preferably 0.5 to 2.

The film forming conditions are described below in the discussion of the preparation of the non-magnetic support.

The surface of uppermost layer A of the non-magnetic support used in the present invention has a center line average surface roughness Ra of preferably $$Ra(Cut\ off\!: 0.25\ mm) - Ra(Cut\ off\!: 0.08\ mm) \leq 10\ nm.$$

More preferably, the difference in Ra is 5 nm or less.

When the Ra value is not greatly varied even when cut off is reduced (e.g., 0.25 mm→0.08 mm), protrusions corresponding to a length of 0.25 mm are absent or small. On the contrary, when the Ra value is greatly varied, undulation over the whole surface of the base is increased, and electromagnetic characteristics are deteriorated. When the Ra value is low, surface smoothness and electromagnetic characteristics are generally improved. However, when surface smoothness is improved, running durability is deteriorated. Particularly, when so-called recent inferior pins are used, durability against inferior pins in particular is very poor. In this case, the magnetic layer itself is cut, and problems with regard to DO and running stop increase.

The present inventors have made studies on how to improve running durability without deteriorating electromagnetic characteristics, and have found that excellent electromagnetic characteristics as well as excellent running durability can be obtained by controlling the difference in Ra measured at the above cut off value even when the absolute value of Ra itself is high.

The Ra value can be controlled by controlling the particle size and amount of the filler particles used in uppermost layer A, by controlling film forming conditions, and by controlling the number of protrusions on the surface of lowermost layer B.

The "center line average surface roughness" is world-wide used to express surface roughness and is defined by JIS B 0601.

In the present invention, the center line average surface roughness Ra is measured in the following manner by using a surface roughness measuring device (SE-3FK) manufactured by Koito Manufacturing Co., Ltd. A portion of the standard length L (2.5 cm) in the direction of the center line of the curved line of the cross section of a film is cut off from the center line. A roughness curve Y=f(X) is obtained where the X axis represents the center line of the cut-off portion, and the Y axis represents the direction of the longitudinal magnification. The center line average roughness Ra (in rim) can be represented by the following formula 1. The measurement is made at each cut-off value (i.e., 0.25 mm and 0.08 mm) under such conditions that the radius of the tip of the contact needle is 2 μm, and the load applied is 30 mg. Ra is determined by the average of the total of 10 points of 5 points in the longitudinal direction and 5 points in the crosswise direction. Formula (I) is shown below:

$$Ra = \frac{1}{L} \int_0^L |f(x)| dx \qquad (I)$$

The preferred embodiments of the present invention will be illustrated below.

(1) A magnetic recording medium wherein the lower layer is a lower non-magnetic layer containing a non-magnetic powder comprising an inorganic powder and carbon black.

(2) More preferably, a magnetic recording medium wherein the lower layer is a lower magnetic layer containing a ferromagnetic powder, and the ferromagnetic powder contained in the upper magnetic layer has an average major axis length which is shorter than that of the ferromagnetic powder contained in the lower magnetic layer.

(3) A magnetic recording medium wherein the number of protrusions of 200 to 400 nm in height present on the surface of the lowermost layer (layer B) of the non-magnetic support is from 800 to 2,000/0.1 mm$^2$, and the number of protrusions of 400 nm or more in height is 300/0.1 mm$^2$ or less.

(4) A magnetic recording medium wherein the lowermost layer (layer B) of the non-magnetic support contains filler particles having an average particle size of 100 to 600 nm, the uppermost support layer (layer A) contains filler particles having an average particle size of 10 to 450 nm, and the multi-layer support includes an interlayer (layer C) comprising a thermoplastic resin between the lowermost support layer (layer B) and the uppermost support layer (layer A).

In the present invention, the dry thickness of the upper magnetic layer is 1 μm or less, preferably from 0.3 to 0.8 μm, which helps reduce self-demagnetization loss and improves output. Further, the non-magnetic support has a multi-layer structure (a laminated layer structure) wherein the uppermost support layer (layer A) contains fine filler particles to smooth the surface thereof and to ensure running properties, the lower non-magnetic or magnetic layer and the upper magnetic layer are provided thereon, and the lowermost support layer (layer B) contains filler particles having an appropriate particle size (i.e. an average particlue size of 100 to 600 nm) to provide appropriate protrusions, whereby the problem of contamination of calender rolls can be solved by a cleaning effect, good running durability against inferior mechanical parts can be obtained by appropriately choosing the type of filler particles, and the magnetic layer can be prevented from recessing. The dry thickness of the lower non-magnetic or magnetic layer is generally from 1.5 to 4 μm, preferably from 2 to 3 μm.

It is preferred that the non-magnetic support used in the present invention has a laminate structure where the interlayer (layer C) of the non-magnetic support comprising at least a thermoplastic resin is laminated onto the lowermost support layer (layer B) comprising a thermoplastic resin containing filler particles having an average particle size of 100 to 600 nm, and the uppermost support layer (layer A) comprising a thermoplastic resin containing inert particles (e.g., CaCO$_3$, SiO$_2$, Al$_2$O$_3$) is laminated onto layer C.

It is preferred that the number of protrusions of 200 to 400 nm in height provided on the surface of the lowermost layer (layer B) of the non-magnetic support is from 800 to 2,000/0.1 mm$^2$, and the number of protrusions of 400 nm or more in height provided thereon is 300/0.1 mm$^2$ or less.

When the filler particles are contained in lowermost support layer B, the calender rolls are prevented from contamination, electromagnetic characteristics are prevented from deterioration and running properties are improved. This effect may be due to the fact that the calender rolls are cleaned by the filler particles. However, conventionally the protrusions on the surface of a lowermost support layer are transferred to the magnetic layer, and electromagnetic characteristics are deteriorated by recesses on the magnetic layer.

In the present invention, the calender rolls can be prevented from contamination, and at the same time, the problem associated with the prior art can be solved, that is, the recessing of the magnetic layer can be prevented by the protrusions on lowermost support layer B. Accordingly, electromagnetic characteristics can be improved.

The average particle size (dB) of the filler particles of layer B is preferably from 100 to 600 nm, more preferably from 100 to 550 nm, from the standpoint of productivity and reducing the contamination of the rolls.

The term "average particle size of the filler particles" as used herein refers to a number-average particle size determined by a method wherein the thermoplastic resin is removed from the non-magnetic support by a plasma low-temperature waste disposal method under such conditions that the particles are not damaged to thereby expose the particles, the particles are observed through a scanning electron microscope (SEM), the image of the particles is processed by an image analyzer, places where the observation is made are changed, and numerical processing is conducted with 5,000 particles or more to determine a number-average particle size.

The amount of the filler particles contained in the lowermost layer (layer B) of the non-magnetic support used in the present invention is generally from 1.5 to 40% by weight, preferably from 2 to 30% by weight, and more preferably from 3 to 20% by weight. When the amount of the filler particles exceeds the above upper limit, electromagnetic characteristics are lowered. When the amount is less than the above lower limit, it is difficult to prevent contamination of the calender rolls.

The ratio (tB/dB) of the thickness (tB) of layer B of the non-magnetic support used in the present invention to the average particle size (dB) of the filler particles contained in layer B is preferably from 0.1 to 3, more preferably from 0.3 to 1.5. When the ratio of tB/dB is less than the above lower limit, the reduction in contamination of the calender rolls may be lowered. When the ratio is more than the above upper limit, electromagnetic characteristics may be lowered.

The number of protrusions of 200 to 400 nm in height present on the lowermost layer (layer B) of the non-magnetic support is generally from 800 to 2,000/0.1 mm$^2$, more preferably 850 to 1,750/0.1 mm$^2$, and even more preferably 1,200 to 1,700/0.1 mm$^2$. When the number of the protrusions is more than 2,000, electromagnetic characteristics could be lowered. When the number of the protrusions is less than 800, running durability may sometimes be less than desired.

The number of protrusions in layer B of 400 nm or above in height is usually 300/0.1 mm$^2$ or less, more preferably 250/0.1 mm$^2$ or less, and even more preferably 200/0.1 mm$^2$ or less. When the number of the protrusions of 400 nm or above in height is more than 300, electromagnetic characteristics have a tendency to be lowered.

The particle size distribution of the filler particles can be adjusted, for example, by orientation of the film during the preparation of the non-magnetic support.

In the present invention, the heights of the protrusions and the number of the protrusions are measured in the following manner. A surface roughness curve is determined by a tally step surface roughness meter (manufactured by Ta or Hobson Co., Ltd.), and the height of peaks recognizable on the curve from the average line is measured.

Filler particles may or may not be contained in layer C of the non-magnetic support. However, it is preferred from the standpoint of running properties that 0.001 to 0.15% by weight, particularly 0.005 to 0.5% by weight of filler particles having an average particle size of 5 to 600 nm, particularly 10 to 450 nm be contained in layer C.

The thickness of layer C is preferably from 2 to 100 μm, more preferably from 3 to 15 μm, though there is no particular limitation with regard to the thickness.

When the filler particles used in the present invention are particles having a particle size ratio (the ratio of the major axis of the particle/the minor axis thereof) of 1 to 1.3, particularly spherical particles, the effect of improving the contamination of the rolls can be remarkable. When the filler particles used in the present invention have a single particle index of at least 0.7, preferably at least 0.9 in the non-magnetic support, the effect can be even more remarkable. When the filler particles used in the present invention have a relative standard deviation of 0.6 or less in the particle size distribution, the effect of the particles can be displayed. The term "single particle index" as used herein refers to a value which is obtained by (X−Y)/X wherein X is an area occupied by filler particles which are not agglomerated when the cross section of the non-magnetic support is observed through a transmission type electron microscope, and Y is an area occupied by two or more filler particles which are agglomerated. The term "relative standard deviation" as used herein refers to a value obtained by dividing the standard deviation of the particle size distribution of the filler particles by the average particle size.

Any particles can be used as the filler particles used in the present invention, so long as the particles have the above-described cleaning function and are composed of materials which do not have any adverse effects on the characteristics of the magnetic recording mediums and instruments used in the magnetic recording mediums. Particles conventionally known as fillers can be used. Examples of the filler particles include inorganic compounds such as silica, alumina, titanium oxide and organic compounds such as particles of various resins.

Examples of the filler particles which can be preferably used in the present invention include substantially spherical silica particles due to colloidal silica and the particles of crosslinked high-molecular materials (e.g., crosslinked polystyrene). Particularly, crosslinked high-molecular-weight particles obtained by elevating a degree of crosslinking until the temperature [measured by using a thermogravimetric analyzer (Shimadzu TG-30M manufactured by Shimadzu Corporation) in nitrogen gas; heating rate: 20° C./min] reaches 38° C. or higher during a 10 wt % weight reduction, are preferred because the contamination of the calender rolls is reduced.

When spherical silica particles due to colloidal silica, e.g., substantially spherical silica particles having a low sodium content prepared by an alkoxide process are used, the effect can be further displayed.

However, other particles such as calcium carbonate particles, titanium oxide particles and alumina particles can be used by controlling appropriately the ratio of the thickness tB of the thermoplastic resin of layer B to the average particle size dB of the filler particles as discussed above.

It is preferred that the non-magnetic support used in the present invention is a biaxially oriented film obtained by biaxially orienting a laminated film composed of a composition for forming layer B, a composition for forming layer A and a composition for forming layer C. The degree of orientation is such that Young's modulus, which is a measure of the degree of the molecular orientation of high-molecular-weight materials, is about 350 kg/mm$^2$ in the longitudinal direction as well as in the crosswise direction, this is the limit from the standpoint of the preparation of the film. However, there is no particular limitation with regard to the degree of orientation.

When the thickness of layer B of the non-magnetic support used in the present invention is in the range of 0.01 to 2 μm, preferably 0.02 to 1 μm, electromagnetic characteristics as well as productivity are especially good.

It is preferred that the unevenness or fluctuation in the thickness of the non-magnetic support is small. It is desirable that a difference between the maximum thickness of the non-magnetic support and the minimum thickness thereof per 200 cm in the longitudinal direction is 0.1 times or less, preferably 0.05 times or less the average thickness of the non-magnetic support.

The preparation of the non-magnetic support used in the present invention will be illustrated in greater detail below.

The following method is effective in containing the filler particles in the thermoplastic resin of layer B. The filler particles are slurried in ethylene glycol, and the resulting slurry and a thermoplastic resin are kneaded together in a vented twin-screw kneading extruder. This method is very effective in obtaining a non-magnetic support in the range described above in terms of the relationship between the thickness and the average particle size and the content without the occurrence of orientation breakage.

The content of the particles can be effectively controlled in the above method in the following manner. A high-concentration master is previously prepared, and is diluted with a thermoplastic resin containing substantially no filler particle during the course of the preparation of the film to control the content of the particles.

Subsequently, the pellets of the thermoplastic resin of layer C (hereinafter, "thermoplastic resin C"), the thermoplastic resin of layer B (hereinafter, "thermoplastic resin B") containing a given amount of the filler particles and the thermoplastic resin of layer A (hereinafter, "thermoplastic resin A") containing a given amount of the filler particles are optionally dried, and then fed into a conventional extruder for melt lamination and extruded through a slit die into a sheet. The sheet is cooled on casting rolls to fix it, thereby obtaining an unoriented film. Specifically, the thermoplastic resins A, B and C are laminated by three extruders and three layer manifolds or confluent blocks, and extruded through a die into a three-layer sheet. The sheet is cooled on the casting rolls to obtain an unoriented film.

It this case, it is effective to provide the polymer flow path of the thermoplastic resin B with a static mixer and a gear pump to obtain a film in the range described above, in terms of the relationship between the thickness and average particle size and content, and having a desired range of surface layer particle concentration ratio without the occurrence of orientation breakage.

It is very effective to use a rectangular feed block as the confluent block to obtain the relationship between the thickness and the average particle size within the range of the present invention. It is desirable that the melt temperatures of the extruders on the sides of the thermoplastic resin B and the thermoplastic resin A are higher by 10° to 40° C. than that of the thermoplastic resin C to obtain a film having the relationship between the thickness and average particle size and content within the range of the present invention, as well as having unevenness in the laminated thickness, having the above-desired concentration ratio of the particles in the surface layer, and having a total reflection Raman crystallization index within a desired range without the occurrence of orientation breakage.

When the thermoplastic resin B is a polyester resin, the term "total reflection Raman crystallization index" as used herein refers to the half width of 1730 cm$^{-1}$ which is the stretching vibration of the carbonyl group when a total reflection Raman spectrum is measured, provided that the depth of the measurement is about 500 to 1,000 Å from the surface. Preferably, the index is from 12 to 18 cm$^{-1}$.

The unoriented film is biaxially stretched to effect biaxial orientation. The stretching method includes a succesive biaxial stretching method and a simultaneous biaxial stretching method. However, the succesive biaxial stretching method wherein stretching is first carried out in the longitudinal direction and then in the crosswise direction is preferred. Particularly, it is preferred that stretching in the longitudinal direction is carried out by at least three stages, and the total stretching ratio in the longitudinal direction and in the crosswise direction is 3.0 to 6.5 times using the above succesive biaxial stretching method. This method is effective in obtaining a non-magnetic support having the relationship between the thickness and average particles size and filler particle content within the range of the present invention. The stretching temperature in the longitudinal direction varies depending on the types of the thermoplastic resins, but is usually from 50° to 130° C. in the first stage and a higher temperature in the second and subsequent stages. The stretching rate in the longitudinal direction is preferably from 5,000 to 50,000%/min. Stretching in the crosswise direction is generally carried out by using a tenter. The stretching ratio is preferably 3.0 to 5.0 times, the stretching rate is preferably 1,000 to 2,000%/min, and the stretching temperature is preferably 80° to 160° C. The stretched film is then heat-treated. The heat treating temperature is preferably from 170° to 200° C., more preferably from 170° to 190° C., and the heat treatment time is preferably 0.5 to 60 seconds.

Thermoplastic resins A, B and C used in the preparation of the non-magnetic support used in the present invention may be the same or different. Examples of the thermoplastic resin include, but are not limited to, polyesters, polyolefins, polyamides and polyphenylene sulfide. Of these resins, polyesters, particularly polyesters comprising, as the principal unit, at least one repeating unit derived from at least one unit selected from the group consisting of ethylene terephthalate, ethylene $\alpha,\beta$-bis(2-chlorophenoxy)ethane-4,4'-dicarboxylate and ethylene 2,6-naphthalate units are preferred from the standpoint of good productivity.

It is preferred that the thermoplastic resin B or the thermoplastic resin A is crystallizable because productivity is better. The term "crystallizable" as used herein means that the resin is not amorphous, that a cold crystallization temperature Tcc in the crystallization parameter can be quantitatively detected, and that the crystallization parameter $\Delta$Tcg is 150° C. or lower. Further, when the resin has such crystallizability that the heat of fusion (change of enthalpy of fusion) measured by a differential scanning calorimeter is at least 7.5 cal/g, productivity is further improved. An ethylene terephthalate unit is particularly preferred.

At least one member selected from the group consisting of the thermoplastic resins A, B and C may be mixed with one or more of the other thermoplastic resins, so long as other resins do not have an adverse effect on the present invention. Alternatively, copolymers may be used. Further, conventional organic additives such as antioxidants, thermal stabilizers, lubricants and ultraviolet light absorbers in an amount conventionally used may be added to at least one member selected from the group consisting of the thermoplastic resins A, B and C, so long as the additives do not have an adverse effect on the present invention.

The non-magnetic support used in the present invention may be previously subjected to a corona discharge treatment, a plasma treatment, an adhesion accelerating treatment, a heat treatment and a dust removal treatment before the support is coated with the coating composition.

The F-5 (i.e., the load at the 5% elongation) value in the tape-running direction of the non-magnetic support is preferably from 5 to 50 kg/mm$^2$, and the F-5 value in the tape-width direction is preferably from 3 to 30 kg/mm$^2$. The heat shrinkage ratio of the non-magnetic support in the tape-running direction and in the tape-width direction is preferably not more than 3%, more preferably not more than 1.5%, at 100° C. for 30 minutes. The heat shrinkage ratio at 30° C. for 30 minutes is preferably not more than 1%, more preferably not more than 0.5%. The breaking strength thereof in the tape-running direction as well as in the tape-width direction is preferably from 5 to 100 kg/m$^2$, and the modulus is preferably from 100 to 2,000 kg/mm$^2$.

Examples of the inorganic powder for use in the lower non-magnetic layer of the present invention include titanium oxide, barium sulfate, red iron oxide, tin oxide, and zinc oxide. The inorganic powder of the lower non-magnetic layer is used in an amount of 0.1 to 20% by weight based on the amount of the binder for use in the lower non-magnetic layer.

A magnetic layer of a magnetic recording medium is a layer composed of a ferromagnetic powder dispersed in a binder. Examples of the magnetic powder which can be used in the present invention include, but are not limited to, conventional ferromagnetic powders such as $\gamma$-Fe$_2$O$_3$, FeOx (1.33<X<1.5), Co-containing $\gamma$-Fe$_2$O$_3$, Co-containing FeOx (1.33<X<1.5), Fe$_3$O$_4$, Co-containing Fe$_3$O$_4$, CrO$_2$, ferromagnetic powder mainly (at least 75%) containing Fe, Ni or Co, barium ferrite and strontium ferrite. Of these compounds, Co-containing Fe$_3$O$_4$ and Co-containing FeOx (1.33<X<1.5) are preferred.

Ferromagnetic powder used in the upper magnetic layer in the present invention is preferably Co-containing iron oxide powder having a ratio by mol of Fe$^{2+}$/Fe$^{3+}$ of preferably 20/100 to 50/100, more preferably 25/100 to 35/100.

The Co-containing iron oxide power used in the upper magnetic layer has a coercive force of 650 to 1,500 Oe (oersted), preferably 750 to 950 Oe. When the coercive force is less than 650 Oe, output in the high frequency region can be lowered, while when the coercive force exceeds 1,500 Oe, output in the low frequency region may be greatly lowered.

With regard to the particle size of the Co-containing iron oxide powder used in the upper magnetic layer, the powder has an average major axis length of preferably 0.10 to 0.25 $\mu$m, more preferably 0.1 to 0.20 $\mu$m. The crystallite size thereof is preferably 500 Å or less, more preferably from 200 to 360 Å. When the average major axis length exceeds 0.25 $\mu$m or the crystallite size exceeds 500 Å, noise may increased. When the average major axis length is less than 0.1 $\mu$m, dispersibility and squareness ratio can be lowered and electromagnetic characteristics are deteriorated.

The ferromagnetic powder used in the lower magnetic layer in the present invention has a ratio by mol of Fe$^{2+}$/Fe$^{3+}$ of less than 20/100 and a coercive force of generally 0.6 to 1.0 times, preferably 0.8 to 1.0 times that of the upper magnetic layer. It is most preferred that the ferromagnetic powder used in the lower magnetic layer has a coercive force of 600 to 850 Oe.

When the coercive force of the lower magnetic layer exceeds 1.0 times that of the upper magnetic layer, electromagnetic characteristics in the long wavelength region can be lowered. When the coercive force of the lower magnetic layer is less than 0.6 times that of the upper magnetic layer, the frequency characteristics of linear audio are sometimes deteriorated.

Co-containing iron oxide powder used in the lower magnetic layer has a ratio by mol of Fe$^{2+}$/Fe$^{3+}$ of generally less than 20/100, preferably 5/100 to 10/100. When the ratio is 20/100 or more, transfer characteristics may deteriorate.

It is preferred that the average major axis length of the Co-containing iron oxide powder used in the lower magnetic layer is from 0.1 to 0.25 $\mu$m and larger than that of the Co-containing iron oxide powder used in the upper magnetic layer. Further, it is preferred that the crystallite size of the Co-containing iron oxide powder used in the lower magnetic layer is larger than that of the Co-containing iron oxide powder used in the upper magnetic layer. More preferably, the Co-containing iron oxide powder used in the lower magnetic layer has an average major axis length of 0.15 to 0.25 $\mu$m and a crystallite size of 300 to 450 Å.

When the average major axis length exceeds 0.25 $\mu$m or the crystallite size exceeds 500 Å, surface properties are deteriorated. When the average major axis length is less than 0.10 $\mu$m, the powder can be poorly dispersed and surface properties may be lowered.

Examples of the binder which can be used in the lower non-magnetic or magnetic layer and in the upper magnetic layer include conventional binders such as thermoplastic resins, thermosetting resins, radiation-curable resins, reactive resins and mixtures thereof. Specific examples of resin components include vinyl chloride copolymers (e.g., vinyl chloride-vinyl acetate copolymers, vinyl chloride-vinyl acetate-vinyl alcohol copolymers, vinyl chloride-vinyl acetate-acrylic acid copolymers, vinyl chloride-vinylidene chloride copolymers, vinyl chloride-acrylonitrile copolymers, ethylene-vinyl acetate copolymers, and vinyl chloride copolymers into which a polar group such as $-SO_3Na$ or $-SO_2Na$ or an epoxy group is introduced); cellulose derivatives such as nitrocellulose resin; acrylic resins; polyvinyl acetal resins; polyvinyl butyral resins; epoxy resins; phenoxy resins; and polyurethane resins (e.g., polyester-polyurethane resins, polyurethane resins into which a polar group such as $-SO_3Na$ or $-SO_2Na$ is introduced, and polycarbonate-polyurethane resins).

When curing agents are used, polyisocyanate compounds are usually used. Examples of the polyisocyanate compounds which can be used as the curing agents include those conventionally used as curing components for polyurethane resins.

When a curing treatment is carried out by electron beam irradiation, compounds having a reactive double bond (e.g., urethane acrylate) can be used.

The binders used in the upper magnetic or magnetic layer and in the lower magnetic layer are used in an amount of 5 to 50% by weight, preferably 10 to 35% by weight, based on the amount of ferromagnetic powder. It is preferred that 5 to 30% by weight of a vinyl chloride resin and 3 to 30% by weight of a polyurethane resin are used in combination with 0 to 20% by weight of the polyisocyanate compound. The binder used in the non-magnetic layer is used in an amount of 1 to 100% by weight, preferably 13 to 50% by weight, based on the amount of non-magnetic powder.

Examples of carbon black which can be used in the non-magnetic and magnetic layers in the present invention include furnace black for rubber, thermal black for rubber, carbon black for coloring and acetylene black. It is preferred that carbon black has a specific surface area of 5 to 500 $m^2/g$, a DBP oil absorption of 10 to 400 ml/100 g, a particle size of 5 to 300 mμ, a pH of 2 to 10, a water content of 0.1 to 10% and a tap density of 0.1 to 1 g/ml.

Specific examples of carbon black which can be used in the present invention include BLACK PEARLLS 2000, 1300, 1000, 900, 800 and 700, VALCAN XC-72 (manufactured by Cabot Co., Ltd.), #80, #60, #50 and #35 (manufactured by Asahi Carbon Co., Ltd.) and #2400B, #2300, #900, #650, #40, #30 and #10B (manufactured by Mitsubishi Kasei Corporation).

The preparation of the magnetic recording mediums of the present invention will be illustrated below.

All of raw materials such as the ferromagnetic powder, the binder, carbon black, the abrasive, the antistatic agent, the lubricant and the solvent may be added at the beginning of the preparation of the coating composition, or they may be added one by one during the course of the preparation. If desired, individual additives may be added portionwise at two or more stages. For example, the polyurethane resin may be added portionwise during the kneading stage, the dispersion stage and the mixing stage for adjusting the viscosity of the mixture after dispersion.

Conventional preparation techniques can be used as a part of the stages to achieve the objects of the present invention. A kneader having an intensive kneading force, such as a continuous kneader or a pressure kneader, can be used in the kneading stage, whereby a magnetic recording medium having a high Br value (i.e., residual magnetic flux density) can be obtained.

When the continuous kneader or the pressure kneader is used, all or a part (preferably at least 30% by weight of the entire binder) of the binder is kneaded in an amount of 15 to 500 parts per 100 parts of the ferromagnetic powder. The details of the kneading treatment are described in JP-A-1-106338 and JP-A-64-79274.

The magnetic recording mediums of the present invention can be more efficiently prepared by using a simultaneous multi-layer coating system described in JP-A-62-212933. Examples of coating devices and coating methods for the preparation of the magnetic recording mediums having a multi-layer structure of the present invention include the following devices and methods.

1. A method wherein the lower layer is first coated by a gravure coating, roll coating, blade coating or extrusion coating device conventionally used for the coating of magnetic coating compositions, and the upper layer is then coated by means of a support pressing type extrusion coating device as described in JP-B-1-46186 (the term "JP-B" as-used herein means an "examined Japanese patent publication"), JP-A-60-238179 and JP-A-2-265672, while the lower layer is still in a wet state.

2. A method wherein a coating composition for the upper layer and a coating composition for the lower layer are coated nearly simultaneously through a coating head having two slits through which the coating compositions are passed as described in JP-A-63-88080, JP-A-2-17921 and JP-A-2-265672.

3. A method wherein a coating composition for the upper layer and a coating composition for the lower layer are coated nearly simultaneously by using an extrusion coating device equipped with a back-up roll as described in JP-A-2-174965.

It is desirable that shear is applied to the coating compositions in the coating head by the method disclosed in JP-A-62-95174 and JP-A-1-236968 to help prevent the electromagnetic characteristics of the magnetic recording mediums from being lowered by the agglomeration of the ferromagnetic powder. Further, it is preferred that the viscosity of the coating compositions is in the numerical range disclosed in JP-A-3-8471.

In the present invention, the lower layer and the upper layer are provided on the non-magnetic support by the so-called wet-on-wet coating system, wherein the upper layer is coated on the lower layer while the lower layer is still in a wet state.

The wet-on-wet coating system for providing the lower layer and the upper layer in the present invention include the so-called successive coating method wherein one layer is first coated and the next layer is rapidly coated thereon while the first layer is still in a wet state and a coating method wherein two or more layers are simultaneously coated by an extrusion coating system.

The wet-on-wet coating system which can be used in the present invention includes a coating method for magnetic recording mediums as described in JP-A-61-139929.

It is necessary that intense orientation is carried out to obtain the magnetic recording mediums of the present invention. It is preferred that a selenoid having at least 1000G (gauss) and a cobalt magnet having at least 2000G are used in combination. Further, it is preferred that a pre-drying stage is provided before orientation so as to give the highest degree of orientation after drying. When the present invention is applied to disk mediums, it is necessary that orientation is randomized rather than non-randamization.

As calendering rolls, heat-resistant plastic rolls prepared from epoxy resins, polyimides, polyamides or polyimide-amides are used. Further, the calendering treatment can be carried out by using metal rolls. The treating temperature is preferably not lower than 70° C., more preferably not lower than 80° C. The linear pressure is preferably not lower than 200 kg/cm, more preferably not lower than 300 kg/cm. The treating rate is from 20 to 700 m/min. When the treatment is carried out at 80° C. or higher under a linear pressure of 300 kg/cm$^2$ or higher, the effect of the present invention can be even more remarkable.

The present invention is now illustrated in greater detail by reference to the following examples which, however, are not to be construed as limiting the present invention in any way. Additionally all "parts" are by weight.

EXAMPLE 1-1

(1) Non-magnetic Support

An ethylene glycol slurry containing crosslinkable polystyrene particles having an average particle size of 100 nm, silica particles due to colloidal silica having an average particle size of 120 nm and aluminum oxide having an average particle size of 100 nm in a ratio of 5:25:65 by weight was prepared. After the ethylene glycol slurry was heat-treated at 190° C. for 1.5 hours, an ester exchange reaction thereof with dimethyl terephthalate was carried out, and a polycondensation reaction was carried out to prepare the pellets of polyethylene terephthalate (hereinafter abbreviated to PET) containing 0.5 to 20% by weight of the particles. In the polycondensation reaction, the polycondensation time was controlled so as to give an intrinsic viscosity of 0.70 (thermoplastic resin B).

An ethylene glycol slurry containing crosslinkable polystyrene particles having an average particle size of 50 nm and silica particles due to colloidal silica having an average particle size of 100 nm in a ratio of 5:95 by weight was prepared. The slurry was treated in the same manner as in the preparation of the thermoplastic resin B to prepare thermoplastic resin A. PET having an intrinsic viscosity of 0.62 was prepared in a conventional manner, and was referred to as thermoplastic resin C.

These polymers were dried at 180° C. under reduced pressure (3 Torr) for 6 hours. Subsequently, the thermoplastic resin B was fed to an extruder 1 and the thermoplastic resin A was fed to an extruder 3. These resins were molten at 290° C. The thermoplastic resin C was fed to an extruder 2 and molten at 280° C. These resins were combined in a confluent block to laminate them. The laminate was wound up around a casting drum having a surface temperature of 30° C. by using an electrostatic applying cast to cool and solidify it, thus preparing an unstretched film composed of the laminate. In the preparation of the laminate, the discharge amount of each extruder was controlled to thereby adjust the total thickness of the laminate, the thickness of the thermoplastic resin layer B, and the thickness of the thermoplastic resin layer A.

The unstretched film was stretched 4.5 times in the longitudinal direction at 80° C. The stretching was carried out by a difference in the peripheral speed between two pairs of rolls and conducted in 4 stages. The resulting uniaxially stretched film was stretched 4.0 times in the width direction at 100° C. and at a stretching rate of 2,000%/min by using a tenter. The film was then heat-treated at 190° C. under a constant length for 5 seconds to thereby obtain a biaxially oriented laminate film having a total thickness of 14.0 μm.

(2) A coating composition for the upper magnetic layer and a coating composition for the lower magnetic layer were prepared by using the following formulations.

| Coating Composition for the Upper Magnetic Layer | |
|---|---|
| Co-γ-FeOx | 100 parts |
| (x being a ratio by mol of | |
| Fe$^{2+}$/Fe$^{3+}$: 30/100) | |
| (coercive force: 800 Oe, average | |
| major axis length: 0.15 μm) | |
| Vinyl Chloride/Vinyl Acetate | 10 parts |
| Copolymer | |
| (sulfonic acid group content: 0.25 wt %) | |
| Polyester Polyurethane | 5 parts |
| (sulfonic acid group content: 0.1 wt %) | |
| Polyisocyanate | 6 parts |
| (Coronate L manufactured by | |
| Nippon Polyurethane Co., Ltd.) | |
| Stearic Acid (commercial) | 1 part |
| Butyl Stearate (commercial) | 1 part |
| α-Alumina | 10 parts |
| (average particle size: 0.1 μm) | |
| Carbon Black | 1 part |
| (average particle size: 70 nm) | |
| Solvent | 100 parts |
| (Butyl Acetate/Methyl Ethyl | |
| Ketone = 7/3 by weight) | |

| Coating Composition for the Lower Magnetic Layer | |
|---|---|
| Co-γ-FeOx | 100 parts |
| (x being a ratio by mol of | |
| Fe$^{2+}$/Fe$^{3+}$: 5/100) | |
| (coercive force: 700 Oe, average | |
| major axis length: 0.20 μm) | |
| Vinyl Chloride/Vinyl Acetate | 11 parts |
| Copolymer | |
| (sulfonic acid group content: 0.25 wt %) | |
| Polyester Polyurethane | 4 parts |
| (sulfonic acid group content: 0.1 wt %) | |
| Polyisocyanate | 6 parts |
| (Coronate L manufactured by | |
| Nippon Polyurethane Co., Ltd.) | |
| Stearic Acid (commercial) | 1 part |
| Butyl Stearate (commercial) | 1 part |
| Carbon Black | 5 parts |
| (average particle size: 20 nm) | |
| Solvent | 100 parts |
| (Butyl Acetate/Methyl Ethyl | |
| Ketone = 7/3 by weight) | |

The above ingredients of each of the above compositions were kneaded and dispersed to obtain each of the coating composition for the upper magnetic layer and the coating composition for the lower magnetic layer.

The resulting coating compositions were coated on the surface of the 14 μm thick polyethylene terephthalate support obtained in (1) above in such an amount as to provide the upper magnetic layer having a dry thickness of 0.5 μm and the lower magnetic layer having a dry thickness of 3.5 μm. The coating was conducted by means of a multiple layered coating method. The coated product was then subjected to magnetic field orientation, drying and supercalendering, and then slitted into a test sample of ½ inch in width.

EXAMPLE 1-2

A non-magnetic support was prepared in the same manner as in the preparation of the (1) non-magnetic support of Example 1-1 except that the colloidal silica used in layer B had an average particle size of 300 nm, the amount of filler added was 10% by weight, and 0.005% by weight of a colloidal silica filler having an average particle size of 10 nm was added to the thermoplastic resin C.

EXAMPLE 1-3

A non-magnetic support was prepared in the same manner as in the preparation of the (1) non-magnetic support of Example 1-1 except that the colloidal silica used in layer B had an average particle size of 550 nm, and the amount of filler added was 4% by weight.

COMPARATIVE EXAMPLES 1 TO 3

Non-magnetic supports were prepared in the same manner as in the preparation of the (1) non-magnetic support of Example 1-1 except that the average particle size of the colloidal silica used in layer B and the amount of filler added were changed.

EXAMPLES 1-4 AND 1-5

The procedure of Example 1-1 was repeated except that the thickness of the upper magnetic layer was changed.

EXAMPLE 1-6

A non-magnetic support was prepared in the same manner as in the preparation of the (1) non-magnetic support of Example 1-1 except that the average particle size and the amount of the colloidal silica used in layer A were changed.

COMPARATIVE EXAMPLES 4 AND 5

The procedure of Example 1-1 was repeated except that the thickness of the upper magnetic layer was changed.

The performances of the resulting samples were evaluated. The results obtained are shown in Table 1 below.

1. Increase in Drop Out (DO)

First, the initial DO of a VHS, T-120 tape is measured in the following manner.

The drop of the reproduced output level, which drops by 16 dB or more over a period of 1/10 (h) or longer, is measured by using a drop out counter. Subsequently, the tape is subjected to FF/REW 100 pass running, and the DO of the tape after 100 pass running is measured in the same manner as in the measurement of the initial DO. The increase of DO over the initial DO is examined.

2. Running Durability

The tape is repeatedly run over a period of 10 minutes using a VHS, T-120 tape. The number of running passes until the reproduced output drops by at least is −6 dB over the initial reproduced output level measured.

3. Calender Roll Contamination

The calender roll contamination is evaluated in the following three grades of O, Δ and X.

The mark O: A lowering in electromagnetic characteristics caused by the calender roll contamination do not occur even when 1,000,000 (m) or more of the coated raw film is continuously calendered.

The mark Δ: Only 500,000 (m) of the coated raw film can be continuously calendered.

The mark X: Less than 500,000 m of the coated raw film can be continuously calendered.

4. Electromagnetic Characteristics
Reproduced Output

Output of 4.2 MHz using VTR AG-3700 (manufactured by Matsushita Electric Industrial Co., Ltd.) was measured. The results obtained are shown in terms of the relative value when the output of a VHS type video tape "Super XGT-120" manufactured by Fuji Photo Film Co., Ltd. is referred to as 0 dB.

C/N Ratio

The ratio of noise to reproduce RF output was measured by using VTR AG6200 manufactured by Matsushita Electric Industrial Co., Ltd. The results of C/N are shown in terms of the relative value when the value of a VHS type video tape "Super XGT-120" manufactured by Fuji Photo Film Co., Ltd. is referred to as 0 dB.

It is apparent from the results shown in Table 1 that the samples of the present invention do not suffer from an increase in DO, are excellent in running durability,

TABLE 1

| | Ex. 1-1 | EX. 1-2 | Ex. 1-3 | Comp. Ex. 1 | Comp. Ex. 2 | Comp. Ex. 3 | Ex. 1-4 | Ex. 1-5 | Ex. 1-6 | Comp. Ex. 4 | Comp. Ex. 5 |
|---|---|---|---|---|---|---|---|---|---|---|---|
| Support Ra: Cut off (0.25): Ra (A) | 17 | 25 | 30 | 30 | 25 | 28 | 17 | 17 | 25 | 17 | 17 |
| Support Ra: Cut off (0.08): Ra (B) | 13 | 20 | 22 | 13 | 10 | 17 | 13 | 13 | 20 | 13 | 13 |
| Support Ra (A)–Ra (B) | 4 | 5 | 8 | 17 | 15 | 11 | 4 | 4 | 5 | 4 | 4 |
| Average particle size (nm) of filler particles in layer B | 120 | 300 | 550 | 120 | 120 | 120 | 120 | 120 | 300 | 120 | 120 |
| Amount (wt %) of filler particles added to layer B | 20 | 10 | 4 | 20 | 50 | 40 | 45 | 10 | 10 | 20 | 20 |
| The number of protrusions (50–400 nm) of layer B | 1400 | 1200 | 800 | 1600 | 4000 | 2000 | 2300 | 1600 | 1200 | 1600 | 1600 |
| The number of protrusions (400 nm or more) of layer B | 100 | 160 | 280 | 100 | 50 | 180 | 200 | 100 | 160 | 100 | 100 |
| Average particle size (nm) of filler particles in layer A | 40 | 40 | 40 | 40 | 40 | 40 | 40 | 40 | 250 | 40 | 40 |
| Amount (wt %) of filler particles added to layer A | 12 | 12 | 12 | 12 | 12 | 12 | 12 | 12 | 1 | 12 | 12 |
| Average particle size (nm) of filler particles in layer C | — | 10 | — | — | — | — | — | — | — | — | — |
| Amount (wt %) of filler particles added to layer C | — | 0.005 | — | — | — | — | — | — | — | — | — |
| Thickness (μm) of upper layer | 0.5 | 0.5 | 0.5 | 0.5 | 0.5 | 0.5 | 0.1 | 1 | 0.5 | 1.5 | 2 |
| Increase of DO per min | 15 | 10 | 20 | 120 | 80 | 70 | 15 | 13 | 11 | 20 | 20 |
| Running durability (passes) | 500 | 500 | 500 | 400 | 250 | 300 | 500 | 500 | 500 | 300 | 150 |
| Calender roll contamination | O | O | O | O | O | O | O | O | O | Δ | x |
| Electromagnetic characteristics | | | | | | | | | | | |
| RF output (dB) | 3.2 | 3 | 2.5 | 0 | 0.2 | 0.3 | 4 | 2.9 | 2.8 | 1.8 | 1 |
| C/N (dB) | 5 | 4.5 | 4 | 0.5 | −0.6 | 0.6 | 4.2 | 3.5 | 3.4 | 1 | 0.5 | do not cause the calender roll contamination, and have improved reproduction output and C/N ratio.

In the samples of Comparative Examples 1 to 3, a difference in Ra between cut off values is 10 nm or more. Hence, undulation over the whole of the surface is large, and electromagnetic characteristics are lowered thereby. The samples of Comparative Examples 4 and 5 show that when the thickness of the upper magnetic layer is increased, loss during recording and reproduction is increased and electromagnetic characteristics are lowered.

EXAMPLE 2 AND COMPARATIVE EXAMPLE 6

A magnetic coating composition for the upper layer and a non-magnetic coating composition for the lower layer were prepared by using the following formulations.

| Magnetic Coating Composition for the Upper Layer | |
| --- | --- |
| Ferromagnetic Powder: Fe Alloy Powder Composition: Fe 93 wt %, Ni 3 wt %, Co 3 wt %, and Zn, Cr, etc. Hc 1600 Oe, σs 135 emu/g Length of Major Axis: 0.18 μm Acicular Ratio: 9 | 100 parts |
| Vinyl Chloride Copolymer (having —SO$_3$Na group and epoxy group) | 10 parts |
| Polyurethane Resin | 5 parts |
| (having —SO$_3$Na group, Mol. Wt. = 45,000) | 5 parts |
| α-Alumina (average particle size: 0.2 μm) | 5 parts |
| Cyclohexanone | 150 parts |
| Methyl Ethyl Ketone | 200 parts |

The above ingredients were mixed and dispersed in a sand mill for 6 hours. Subsequently, 5 parts of polyisocyanate (Coronate L), 5 parts of stearic acid and 10 parts of butyl stearate were added thereto to obtain the magnetic coating composition.

| Non-Magnetic Coating Composition for the Lower Layer | |
| --- | --- |
| Particulate TiO$_2$ (average particle size: 0.09 μm) | 100 parts |
| Carbon Black (average particle size: 20 mμ) | 5 parts |
| Vinyl Chloride Copolymer (having —SO$_3$Na group and epoxy group, Mol. Wt. = 50,000) | 8 parts |
| Polyurethane Resin (having —SO$_3$Na group Mol. Wt. = 45,000) | 5 parts |
| α-Alumina (average particle size: 0.2 μm) | 5 parts |
| Cyclohexanone | 150 parts |
| Methyl Ethyl Ketone | 50 parts |

The above ingredients were mixed and dispersed in a sand mill for 4 hours. Subsequently, 5 parts of polyisocyanate (Coronate L), 5 parts of stearic acid and 10 parts of butyl stearate were added thereto to obtain the non-magnetic coating composition for the lower layer.

The resulting compositions were coated on the surface of the 14 μm thick polyethylene terephthalate prepared in (1) above in such an amount as to provide an upper layer having a thickness of 0.3 μm and a lower layer having a thickness of 3.0 μm. The coating was conducted by means of a multiple layered coating method. The coated product was subjected to magnetic field orientation, drying and supercalendering, and then slitted into a test sample of ½ inch width. The performances of the resulting samples were evaluated. The results obtained are shown in Table 2 below.

TABLE 2

| | Ex. 2 | Comp. Ex. 6 |
| --- | --- | --- |
| Support Ra: Cut off (0.25): Ra (A) | 17 | 30 |
| Support Ra: Cut off (0.08): Ra (B) | 13 | 13 |
| Support Ra (A)–Ra (B) | 4 | 17 |
| Average particle size (nm) of filler particles in layer B | 120 | 120 |
| Amount (wt %) of filler particles added to layer B | 20 | 20 |
| The number of protrusions (50–400 nm) of layer B | 1400 | 1600 |
| The number of protrusions (400 nm or above) of layer B | 100 | 100 |
| Average particle size (nm) of filler particles in layer A | 40 | 40 |
| Amount (wt %) of filler particles added to layer A | 12 | 12 |
| Average particle size (nm) of filler particles in layer C | — | — |
| Amount (wt %) of filler particles added to layer C | — | — |
| Thickness (μm) of upper layer | 0.3 | 0.3 |
| Increase of DO per min | 10 | 70 |
| Running durability (passes) | 500 | 300 |
| Calender roll contamination | ○ | ○ |
| Electromagnetic characteristics | | |
| RF output (dB) | 5.0 | 2.5 |
| C/N (dB) | 7 | 3.0 |

Note: The calendar roll contamination in evaluated in the same manner as Table 1.

It is apparent from the results shown in Table 2 that when Ra(Cut off: 0.25 mm)−Ra(Cut off: 0.08 mm)≦10 nm in the magnetic recording medium wherein the lower layer is the non-magnetic layer and the upper layer is the magnetic layer, the occurrence of drop out can be reduced, running durability can be remarkably improved, and further electromagnetic characteristics such as RF output and C/N ratio can be improved.

According to the present invention, the support having a multi-layer structure comprising at least one of the uppermost layer and the lowermost layer wherein the uppermost layer has a center line average roughness Ra in the range of Ra(Cut off: 0.25 mm)−Ra(Cut off: 0.08 mm)≦10 nm is used. The lower layer comprising at least one member of a ferromagnetic powder and a non-magnetic powder dispersed in the binder is provided on the support, and the upper magnetic layer having a dry thickness of 1 μm or below comprising a ferromagnetic powder dispersed in the binder is provided on the lower layer while the lower layer is still wet. In this manner, magnetic recording medium which can reduce the occurrence of drop out (DO), which is excellent in running durability, which does not cause calender roll contamination and which is excellent in electromagnetic characheristics such as RF output and C/N ratio is obtained.

While the present invention has been described in detail and with reference to specific embodiments thereof, it is apparent to one skilled in the art that various changes and modifications can be made therein without departing from the spirit and the scope of the present invention.

What is claimed is:

1. A magnetic recording medium formed by providing on a non-magnetic support a lower layer comprising at least one of a ferromagnetic powder and a non-magnetic powder dispersed in a binder, and providing on the lower layer while the lower layer is in a wet condition, an upper magnetic layer comprising a ferromagnetic powder dispersed in a binder, wherein the upper magnetic layer has a dry thickness of 1.0 μm or less, and the non-magnetic support is a multi-layer structural support comprising at least an uppermost support layer and a lowermost support layer, wherein the uppermost support layer is coated with the lower layer, each of the uppermost support layer and the lowermost support layer comprising a biaxially oriented film comprising a thermoplastic resin containing filler particles, and the uppermost support layer has a center line average surface roughness, measured in accordance with JIS B 0601, in the range defined by the following formula:

$$Ra(Cut\ off\colon 0.25\ mm) - Ra(Cut\ off\colon 0.08\ mm) \leq 10\ nm.$$

2. The magnetic recording medium as in claim 1, wherein the filler particles contained in the lowermost support layer of the non-magnetic support have an average particle size of 100 to 600 nm.

3. The magnetic recording medium as in claim 1, wherein the lower layer is a non-magnetic layer containing an inorganic powder and carbon black.

4. The magnetic recording medium as in claim 1, wherein the lower layer is a magnetic layer containing a ferromagnetic powder, and the average major axis length of the ferromagnetic powder contained in the upper magnetic layer is shorter than that of the ferromagnetic powder contained in the lower magnetic layer.

5. The magnetic recording medium as in claim 1, wherein the surface of the lowermost support layer of the non-magnetic support has 800 to 2,000 protrusions having a height of from 200–400 nm per 0.1 mm$^2$ of surface area, and 300 or fewer protrusions having a height of greater than 400 nm per 0.1 mm$^2$ of surface area.

6. The magnetic recording medium as in claim 1, wherein the lowermost support layer of the non-magnetic support contains filler particles having an average particle size of 100 to 600 nm, the uppermost support layer contains filler particles having an average particle size of 10 to 450 nm, and the non-magnetic support further comprises an interlayer positioned between the lowermost support layer and the uppermost support layer, wherein the interlayer of the non-magnetic support comprises a thermoplastic resin.

* * * * *